US007308327B2

(12) United States Patent
Coburn et al.

(10) Patent No.: US 7,308,327 B2
(45) Date of Patent: Dec. 11, 2007

(54) METHOD OF APPLICATION PROTOCOL MONITORING FOR PROGRAMMABLE LOGIC CONTROLLERS

(75) Inventors: James Coburn, Cleveland Heights, OH (US); Joe Walacavage, Ypsilanti, MI (US)

(73) Assignees: Ford Motor Company, Dearborn, MI (US); Rockwell Automation Technologies, Inc., Mayfield Heights, OH (US)

( * ) Notice: Subject to any disclaimer, the term of this patent is extended or adjusted under 35 U.S.C. 154(b) by 44 days.

(21) Appl. No.: 11/432,864

(22) Filed: May 12, 2006

(65) Prior Publication Data
US 2007/0265721 A1   Nov. 15, 2007

(51) Int. Cl.
*G06F 19/00* (2006.01)
(52) U.S. Cl. ....................................................... 700/97
(58) Field of Classification Search ................. 700/97, 700/98, 180, 181, 182, 86, 88
See application file for complete search history.

(56) References Cited

U.S. PATENT DOCUMENTS

| 4,510,565 | A | 4/1985 | Dummermuth ................. 700/7 |
| 4,928,221 | A | 5/1990 | Belkhiter ...................... 700/86 |
| 4,931,951 | A | 6/1990 | Murai et al. .................. 706/61 |
| 4,998,206 | A | 3/1991 | Jones et al. ................... 700/96 |
| 5,050,088 | A | 9/1991 | Buckler et al. ............... 700/96 |
| 5,249,135 | A | 9/1993 | Fujita ........................... 700/179 |
| 5,377,116 | A | 12/1994 | Wayne et al. ............... 700/175 |
| 5,377,315 | A | 12/1994 | Leggett ....................... 345/440 |
| 5,388,051 | A | 2/1995 | Seki et al. .................... 700/169 |
| 5,402,349 | A | 3/1995 | Fujita et al. .................. 700/97 |
| 5,574,637 | A | 11/1996 | Obata et al. .................. 700/2 |
| 5,644,493 | A | 7/1997 | Motai et al. .................. 700/96 |
| 5,758,123 | A | 5/1998 | Sano et al. ................... 703/22 |
| 5,796,618 | A | 8/1998 | Maeda et al. ................ 700/182 |
| 5,963,447 | A | 10/1999 | Kohn et al. .................. 700/49 |
| 6,061,603 | A | 5/2000 | Papadopoulos et al. ....... 700/83 |
| 6,134,676 | A | 10/2000 | VanHuben et al. ........... 714/39 |

(Continued)

FOREIGN PATENT DOCUMENTS

EP     0 508 308 A3    10/1992

OTHER PUBLICATIONS

Beck et al., "Applying a Component-Based Software Architecture to Robotic Workcell Applications". IEEE Transactions on Robotics and Automation, vol. 16, No. 3, Jun. 2000.

(Continued)

*Primary Examiner*—Kidest Bahta
*Assistant Examiner*—Chad Rapp
(74) *Attorney, Agent, or Firm*—Gary A. Smith; Bliss McGlynn, P.C.

(57) ABSTRACT

A method is provided of application protocol monitoring for a manufacturing line including the steps of constructing a manufacturing line model for the manufacturing line, utilizing logic for a programmable logic controller (PLC), executing a control logic simulation of the PLC logic to validate the PLC logic against the manufacturing line model, creating a database containing validated I/O tag expected intents confirmed from the control logic simulation, and applying the application protocol monitoring device to a network for the manufacturing line to monitor traffic across the network and continuously compare the I/O tag status across the network to the database of validated I/O tag expected intents.

20 Claims, 4 Drawing Sheets

U.S. PATENT DOCUMENTS

| | | | |
|---|---|---|---|
| 6,167,406 A | 12/2000 | Hoskins et al. | 707/102 |
| 6,185,469 B1 | 2/2001 | Lewis et al. | 700/99 |
| 6,223,134 B1 | 4/2001 | Rust et al. | 702/121 |
| 6,263,487 B1 | 7/2001 | Stripf et al. | 717/171 |
| 6,282,238 B1 | 8/2001 | Landry | 375/222 |
| 6,282,454 B1 | 8/2001 | Papadopoulos et al. | 700/83 |
| 6,285,748 B1 | 9/2001 | Lewis | 379/112.01 |
| 6,292,707 B1 | 9/2001 | Hair et al. | 700/97 |
| 6,292,715 B1 | 9/2001 | Rongo | 700/249 |
| 6,430,626 B1 | 8/2002 | Witkowski et al. | 709/249 |
| 6,442,441 B1 | 8/2002 | Walacavage et al. | 700/86 |
| 6,470,301 B1 | 10/2002 | Barral | 703/6 |
| 6,516,192 B1 | 2/2003 | Spaur et al. | 455/450 |
| 6,526,373 B1 | 2/2003 | Barral | 703/6 |
| 6,615,251 B1 | 9/2003 | Klug et al. | 709/218 |
| 6,662,015 B2 | 12/2003 | Furlong | 455/465.5 |
| 6,741,595 B2 | 5/2004 | Maher, III et al. | 370/392 |
| 6,741,898 B2 | 5/2004 | Baumgartner et al. | 700/96 |
| 6,748,283 B2 | 6/2004 | Walacavage et al. | 700/96 |
| 6,847,922 B1 | 1/2005 | Wampler, II | 703/1 |
| 6,862,553 B2 * | 3/2005 | Schwenke et al. | 702/183 |
| 2002/0120921 A1* | 8/2002 | Coburn et al. | 717/140 |
| 2004/0128120 A1* | 7/2004 | Coburn et al. | 703/26 |

OTHER PUBLICATIONS

Frey et al. "Formal Methods in PLC Programming", IEEE International Conference on Systems, Man and Cybernetics, Nashville, Tennessee, Oct. 2000.

Leduc, Ryan James, "PLC Implementation of DES Supervisor for a Manufacturing Testbed: An Implementation Perspective", Thesis submittal, Graduate Department of Computer and Electrical Engineering, University of Toronto, 1996, pp. i-xv, 50-51, 129-143, obtained via http://www.cas.mcmaster.ca/~leduc/rleduc-masc.pdf.

Lee Schruben, "Simulation Modeling with Event Graphs", 1983, ACM, Communications of the ACM, vol. 26, No. 11, pp. 957-963.

Tyler Phillips, "Automod™ by Autosimulations", 1998, Proceedings of the 1998 Winter Simulation Conference, pp. 213-218.

Diedra L. Donald, "A Tutorial on Ergonomic and Process Modeling Using Quest and IGRIP", 1998, Proceedings of the 1998 Winter Simulation Conference, pp. 297-302.

Jerry Banks, ed., "Handbook of Simulation", 1998, John Wiley & Sons, pp. 519-545.

S. Vedapudi, "Using MCM to do Emulation of a Car Assembly Line", Brooks Automation Symposium, 2001, pp. 1-4.

W. Dong, F. Palmquist, and S. Lidholm, "A Simple and Effective Emulation Tool Interface Development for Tricept Application", Proceedings of the 33rd ISR, Oct. 7-11, 2002, 4 pages.

S. Kanai, T. Kishinami, "A Virtual Verification Environment for the Sequence Control System Using VRML and JAVA," 1999 by ASME, pp. 1-8.

"ThermaView Advanced Welder Diagnostics System," 1998.

Matthew Rohrer, "Automod Product Suite Tutorial (Automod, Simulator, AutoSat) by Autosimulations", Proceeding of the 1999 Winter Simulation Conference, pp. 220-226.

* cited by examiner

METHOD OF APPLICATION PROTOCOL MONITORING FOR PROGRAMMABLE LOGIC CONTROLLERS

BACKGROUND OF THE INVENTION

1. Field of the Invention

The present invention relates generally to programmable logic controllers and, more specifically, to a method of application protocol monitoring for programmable logic controllers for manufacturing a motor vehicle.

2. Description of the Related Art

It is known that programmable logic controller (PLC) code is written by controls engineers after assembly tooling designs are completed and a manufacturing process has been defined. Once the programmable logic controller code is written, it is used by programmable logic controllers to control and monitor machine tools used in the manufacture of parts and assemblies for motor vehicles.

It is also known that a manufacturing line is typically made of three to twenty linked workcells. Each workcell consists of a tool such as a fixture to position a product, for example sheet metal, and associated automation, for example robots, that process the product, for example by welding. The workcell typically consists of a fixture/tool surrounded by three or four robots. The product is then transferred to the next workcell in the manufacturing line for further processing, until it exits the manufacturing line.

A major problem faced during launch of a vehicle and new equipment start-ups on the manufacturing line is assuring that various devices receive the appropriate control signals. In the past, the devices were interlocked via signal lines or electrical wires with low voltage discrete signals. To determine whether appropriate signals were received, an operator used a voltmeter to measure whether a specific device received a discrete voltage signal. But with the increasing use of networks to replace the individual signal lines, this transaction is less visible. Frequently, multiple and different software monitoring tools that are specific to the various devices are used on a network to watch the effect of signals passing from one device to another. Current network monitoring tools can detect the presence and values of control I/O "tags" that are being communicated through an Ethernet of a manufacturing plant for the motor vehicle. However, these network monitoring tools do not have the capability or information required to determine if the "tag" value is correct (expected) or if the tag values should even be present (active at a particular time or setting a dependency).

Therefore, it is desirable to provide application protocol monitoring for programmable logic controllers. It is also desirable to provide a method for establishing and monitoring data tables of a manufacturing line, rather than an isolated data table of a programmable logic controller. It is further desirable to provide a method of protocol monitoring for viewing I/O "tag" activity for tooling and workcells of a manufacturing line. Therefore, there is a need in the art to provide a method that meets at least one of these desires.

SUMMARY OF THE INVENTION

Accordingly, the present invention is a method of application protocol monitoring for programmable logic controllers on a manufacturing line. The method includes the steps of constructing a manufacturing line model for the manufacturing line and utilizing logic for a programmable logic controller (PLC). The method also includes the steps of executing a control logic simulation to validate the PLC logic against the manufacturing line model. The method includes the steps of creating a database containing validated I/O tag expected intents confirmed from the control logic simulation. The method further includes applying the application protocol monitoring device to a network for the manufacturing line to monitor traffic across the network and continuously compare the I/O tag status across the network to the database of validated I/O tag expected intents.

One advantage of the present invention is that a method of application protocol monitoring is provided for monitoring programmable logic controllers used in a manufacturing line to manufacture a motor vehicle. Another advantage of the present invention is that the method has the ability to sit parasitically on a network and monitor source and destination traffic, and reuse model based data originating in an upstream control logic simulation model. Yet another advantage of the present invention is that the method significantly reduces vehicle launch time by enabling a user from a single location to directly watch meaningful state information in multiple devices as they are passed over the network without having other software packages open and operating at multiple locations in the manufacturing plant. Still another advantage of the present invention is that the method establishes and monitors data tables from a manufacturing line, rather than a data table from an isolated programmable logic controller.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
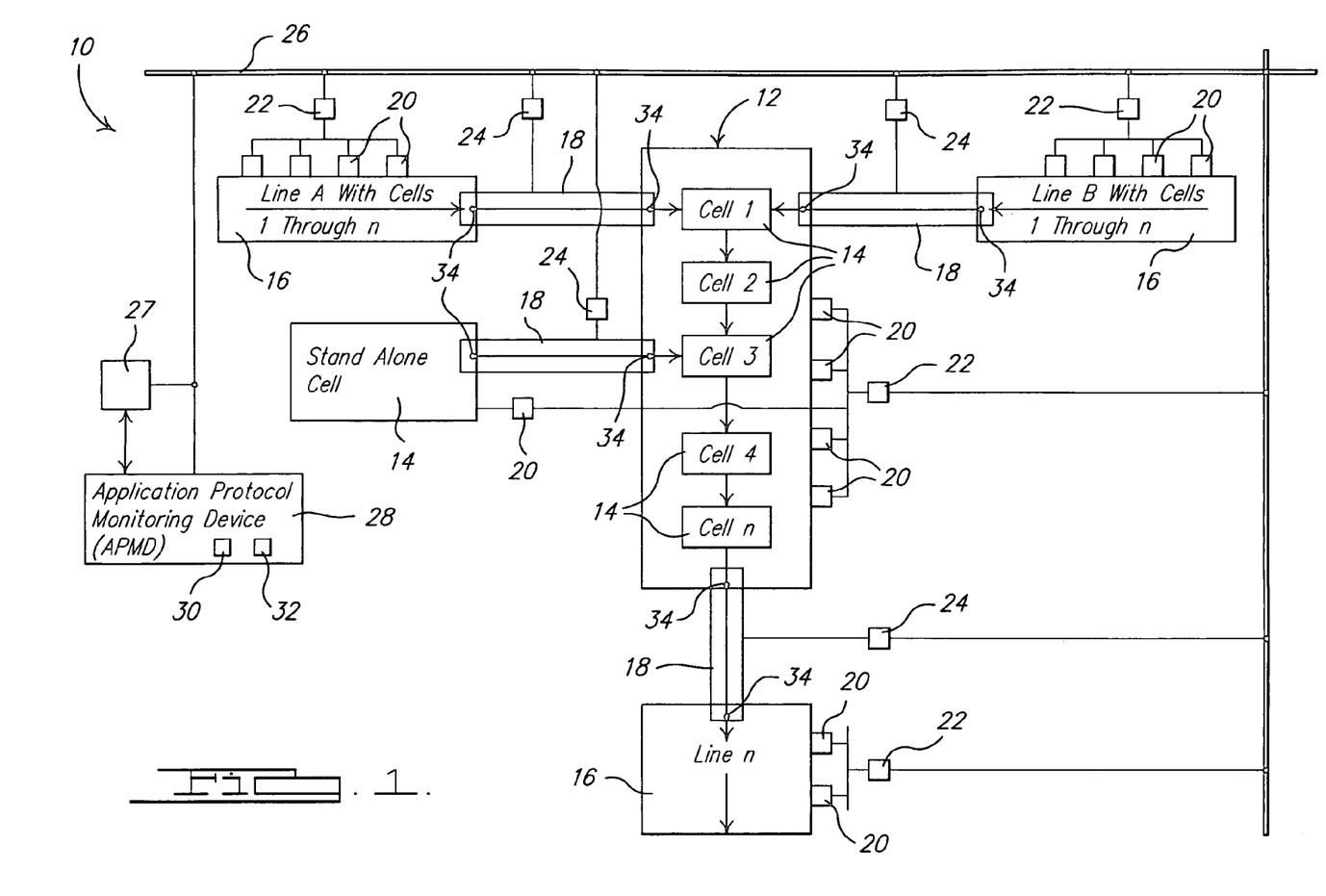
FIG. 1 is a diagrammatic view of a system, according to the present invention, for application protocol monitoring for a manufacturing line.

Referring to the drawings and in particular FIG. 1, one embodiment of a system 10, according to the present invention, for application protocol monitoring for a manufacturing line, generally indicated at 12, is illustrated. The manufacturing line 12 includes at least one, preferably a plurality of workcells 14. The workcells 14 are grouped together in at least one, preferably a plurality of workcell lines 16. The manufacturing line 12 may include at least one, preferably a plurality of material handling/transfer (MH) systems 18. One of the MH systems 18 is located between a pair of workcell lines 16 such that the MH system 18 transfers material between the workcell lines 16. It should be appreciated that there may be a standalone workcell 14 and that one MH (MH) system 18 is disposed between the standalone workcell 14 and a workcell line 16. It should also be appreciated that the workcell line 16 may have one or more workcells 14, e.g., cell 1, cell 2, cell 3, cell 4, to cell n.

The manufacturing line 12 also includes at least one, preferably a plurality of cell or first programmable logic controllers (PLC) 20. One cell PLC 20 is associated with one workcell 14. The manufacturing line 12 includes at least one, preferably a plurality of line control or second programmable logic controllers 22. One line PLC 22 is associated with one workcell line 16 and communicates with each cell PLC 20. The manufacturing line 12 includes at least one, preferably a plurality of material handling (MH) or third programmable logic controllers 24. One MH PLC 24 is associated and communicates with one MH system 18.

Figure 1A:
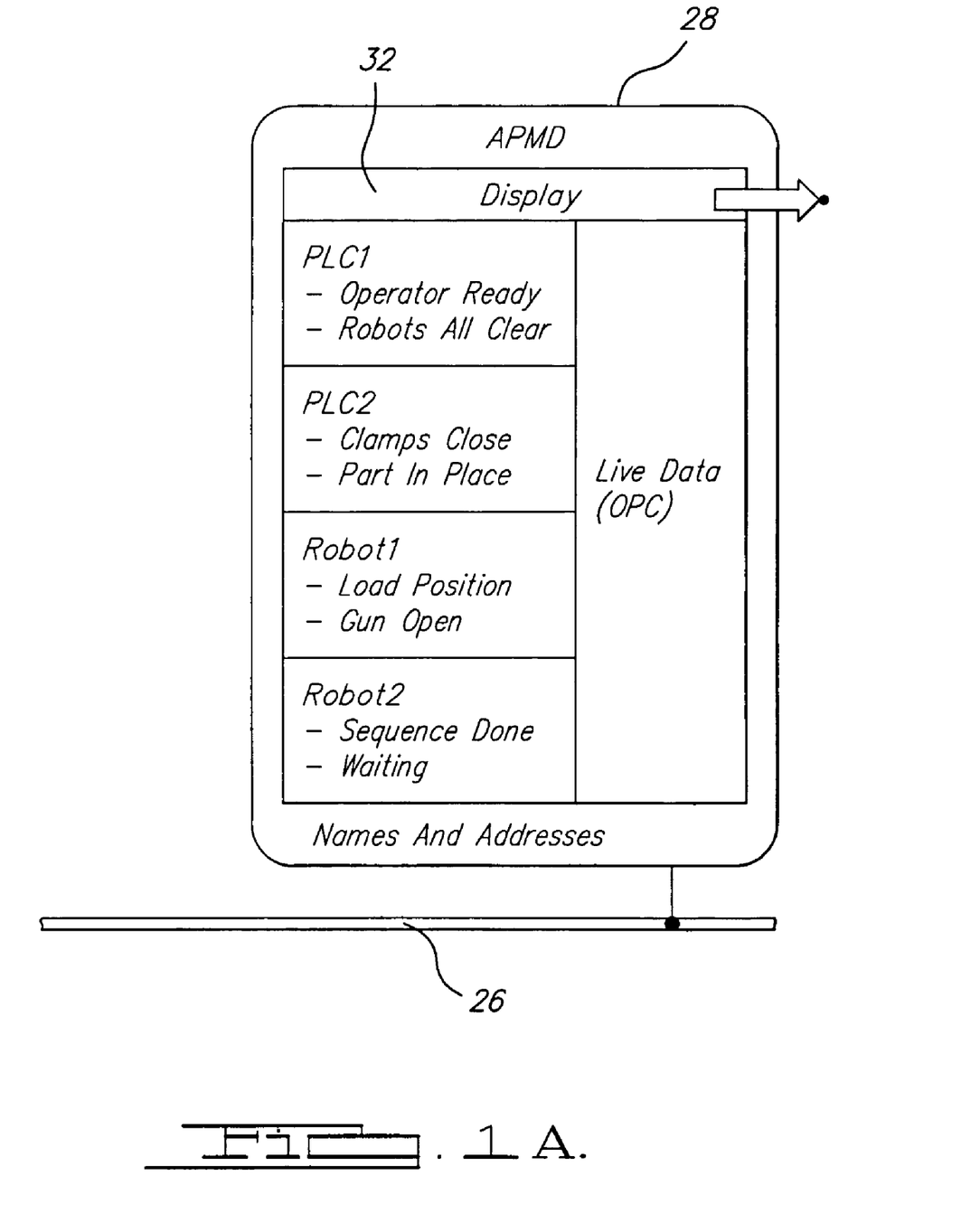
FIG. 1A is an enlarged view of an application protocol monitoring device (APMD) of the system of FIG. 1.

The system 10 includes an electronic link such as an Ethernet 26 connected to and communicating with each line control PLC 22 and MH PLC 24. The system 12 includes a computer 27 to send and receive information through the Ethernet 26. The system 10 also includes an application protocol monitoring device (APMD) 28, according to the present invention, resident on the computer 27 and communicating with the Ethernet 26. As illustrated in FIGS. 1 and 1A, the APMD 28 includes at least one database 30 or is networked to a database 30 of validated I/O "tag" expected intents confirmed from control logic simulations. The APMD 28 also includes a user interface 32 that can be configured like other typical panel view systems in the control industry to display user chosen zones, which would typically be interlocked zone control I/O "tag" status and compare the I/O tag status to expected intent as defined from validated control logic simulation models stored in the database 30. It should be appreciated that the AMPD 28 would identify the I/O tag and their respective value and/or destination (I/O tag dependencies) that had values not equal to the expected value and corrections to programmable control logic would typically need to be done through use of controls programming terminals (not shown). It should be appreciated that a "tag(s)" is conventional and known in the control industry.

Referring to FIG. 1, the system 10 also includes at least one, preferably a plurality of control logic interlocks or interface/interlock logic points 34. It should be appreciated that interlock logic typically applies where there is a transfer of material/part/assembly "ownership" between workcell lines 16 and MH systems 18. It should also be appreciated that the computer 27, Ethernet 26, PLCs, and sources are conventional and known in the art.

Figure 2:
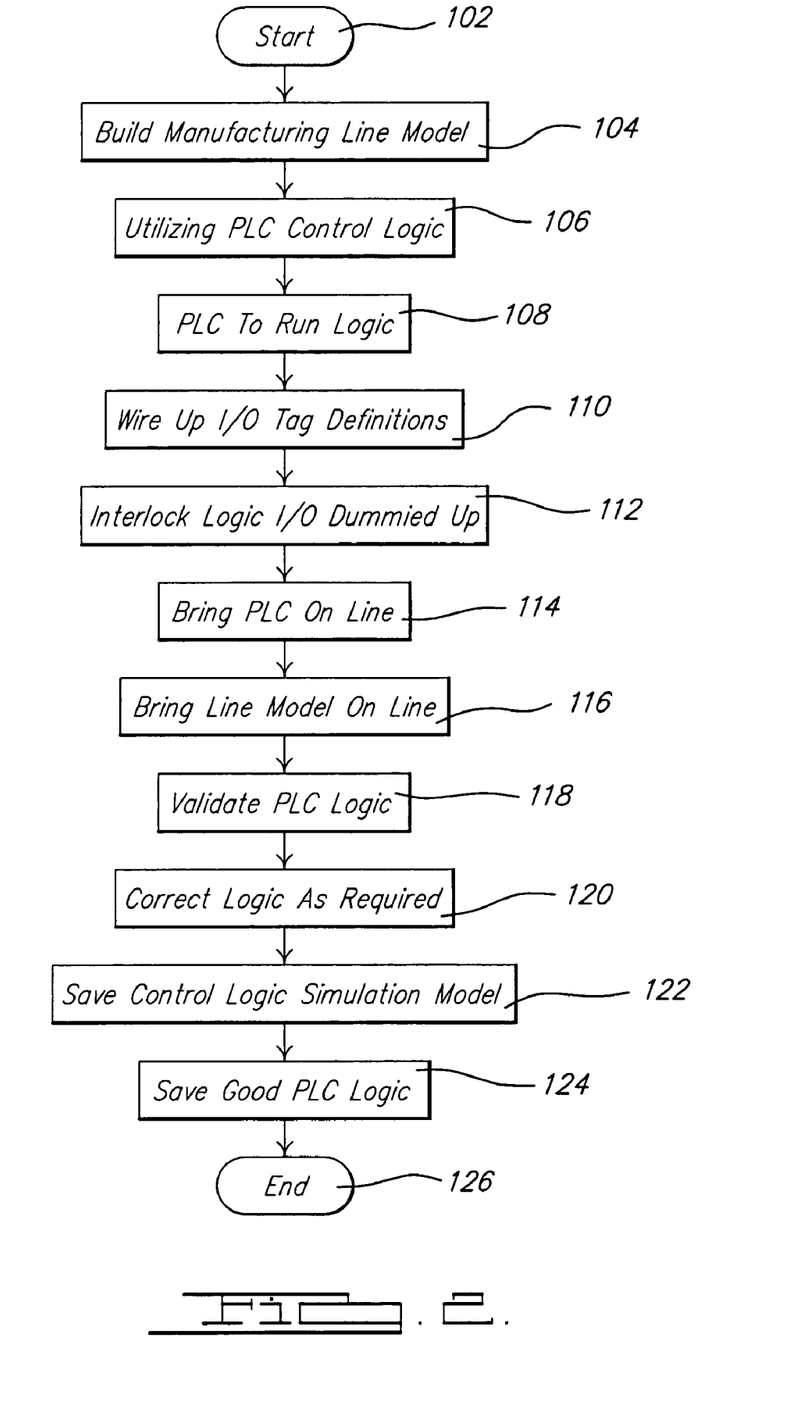
FIG. 2 is a flowchart of a method, according to the present invention, of application protocol monitoring for programmable logic controllers of a single manufacturing line for the system of FIG. 1.
Figure 3:
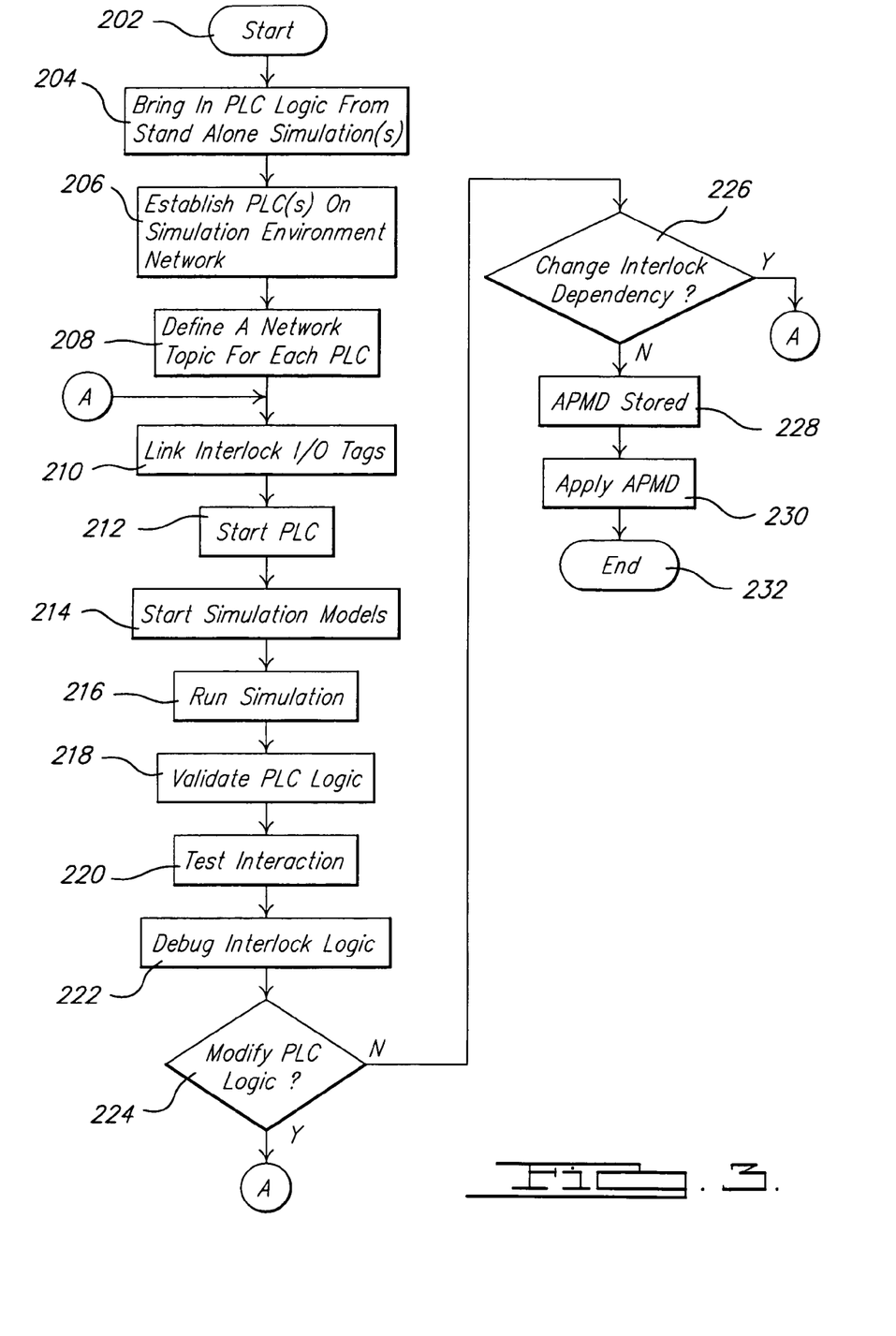
FIG. 3 is a flowchart of a method, according to the present invention, of application protocol monitoring for programmable logic controllers of a multi-system manufacturing line for the system of FIG. 1.

Referring to FIGS. 2 and 3, one embodiment of a method, according to the present invention, of application protocol monitoring for the manufacturing line 12 with the system 10 is shown. As illustrated in FIG. 2, the method initially performs control logic simulations for each individual workcell line 16 and each individual MH system 18 without consideration for interlocks. This part of the method is used to validate the control design for each individual workcell line 16 and MH system 18. It should be appreciated that this control logic simulation is a "single" manufacturing system control logic simulation.

As illustrated in FIG. 3, the method performs a "multi-manufacturing" system control logic simulation to debug control logic interlocks 34. The now validated control logic simulation models contain the expected intent (value, targeted I/O tags, I/O tag dependencies required) of the control logic I/O tags that are required to run the integrated manufacturing line 12. This validated tag data is reused by the AMPD 28. The multi-manufacturing system control logic simulation is conducted on an Ethernet 26 of a typical office versus a manufacturing plant for all the integrations of the manufacturing line 12. It should be appreciated that the AMPD 28 has a network "watcher" function that captures I/O names (tags) and/or I/O addresses with status and contains a mapping database or is networked to a mapping database of validated I/O tag expected intents confirmed from control logic simulations. It should also be appreciated that the method is carried out on the computer 27 of the system 10 by a user or operator (not shown).

Referring to FIG. 2, the method performs a "single manufacturing" system or line control logic simulation. The method starts in bubble 102 and advances to block 104. In block 104, the method builds a manufacturing system or line model for purpose of control simulation. The manufacturing line model represents tooling, workcell, workcell lines, and MH systems for the manufacturing line 12. The manufacturing line model is typically built by reusing simulation library items (e.g., valves, sensors, turntable, clamp, robot, etc.) and will contain actuators and sensors and hard wired devices that are either on or off, but only actuated by an operator (e.g., e-stops, gate locks, actuated mats, light curtains, etc.). In general, a model is typically some representation of critical elements of a real entity. An example of a manufacturing line model is disclosed in U.S. Pat. No. 6,442,441 to Walacavage. It should be appreciated that the PLC logic contains interlocked events (sometimes referred to as networked events), which define the required dependencies, actions, and signals that are associated with sequencing and cycling manufacturing tooling devices. For example, in constructing a vehicle body (not shown) of the motor vehicle, PLC code would have individual events that describe when the conditions were correct for a clamp to open or close.

From block 104, the method advances to block 106 and brings in or utilizes the PLC control logic for the manufacturing line model of the manufacturing line 12. The PLC control logic is PLC code that would go into the PLC on the manufacturing plant floor for the tools of the manufacturing line 12. The method brings in or utilizes either a hardware PLC or an emulator based PLC to run the PLC logic. The hardware PLC is a physical PLC and the emulator based PLC is a software program that emulates a physical PLC. It should be appreciated that emulators are conventional and known in the art.

From block 108, the method then advances to block 110 and "wires" up the manufacturing model with the PLC logic to enable a data or memory table used by simulation of I/O tag definitions to sensors and actuators located in the manufacturing line model of the manufacturing line 12. For example, the PLC outputs are set to intended destination on tooling, typically to actuators (e.g., valves) and PLC inputs are set to expected signals from tooling, typically sensors. It should be appreciated that mapping I/O tag definitions to the manufacturing line model creates a file/table/database that describes the I/O communications and I/O dependencies required to run the simulation successfully. It should also be appreciated that the user or operator performs or assures the wiring up.

After block 110, the method advances to block 112 and "dummy ups" the interlock logic I/O to conduct simulation because there is nothing present to wire to. On the single manufacturing system model, part entry and exit Interlock I/O are dummied up or nulled to allow the manufacturing line model to run or execute. The method then advances to block 114 and brings the PLC 20,22,24 on line. The method then advances to block 116 and brings the manufacturing line model on line. It should be appreciated that "bringing on line" is conventional and known in the art.

From block 116, the method advances to block 118 and validates the PLC logic for a single manufacturing system (tooling, MH, etc.) to get the manufacturing line model to deliver the expected sequence intent for the manufacturing design process. The validation occurs by a user or operator with a display or computer screen looking at the simulation perform and comparing or interrogation of the simulation by the operator of the system 10. As part of the PLC logic validation, the method performs a control logic automatic mode testing. For control logic automatic mode testing during simulation, the operator puts the line or tooling in a run condition and see if keeps running. As also part of the validation, the method performs control logic manual mode testing such as recovery from stops. For the control logic manual mode testing during simulation, the logic is controlled manually by the operator. As further part of the validation, the method performs control logic hard wired device testing such as related sensors that are hard wired directly to PLC, e.g. a control mat. In this control logic hard wired device testing mode, the logic pushes an e-stop or instructs a device in simulation that someone is standing on a control mat or in a light current so that predicted pattern of the manufacturing system occurs. It should be appreciated that validation of the PLC code is performed without interlocks such that the PLC code is valid for the single PLC before interlocking the PLCs together.

After block 118, the method advances to block 120 and the method corrects the PLC logic as required. For example, the operator would modify the PLC code to get the manufacturing line model to deliver the expected sequence intent for the manufacturing design process. The method then advances to block 122 and saves the control logic simulation model with I/O map table/database. It should be appreciated that the control logic simulation model has the ability to introduce parts into any point in the manufacturing line 12, typically bringing parts in to the beginning of the manufacturing line 12 and deleting parts after the last station of the manufacturing line 12. It should also be appreciated that parts are key to control logic simulation as they set off part present sensors.

After block 122, the method then advances to block 124 and saves the "good" or correct PLC logic from the single manufacturing system perspective. The method then advances to bubble 126 and ends. It should be appreciated that the single manufacturing system simulation accounts for I/O that is not communicated over the network as most of the single manufacturing systems are directly wired to a PLC and communicate directly with the PLC. It should also be appreciated that the single manufacturing system simulation provides a good or correct model with good or correct logic, but does not contain validated interlock logic.

Referring to FIG. 3, the method performs multi-manufacturing system or interlocked control logic simulation for the manufacturing line 12. This part of the method validates the interlock logic that enables transfer of parts between lines 16 and systems 18 of the manufacturing line 12. The communication of interlock logic I/O tags is typically done over the plant Ethernet 26 as each line 16 or system 18 will have its own dedicated PLC 22,24.

As illustrated, the method begins in bubble 202 and advances to block 204. In block 204, the method brings in or utilizes PLC logic from the stand alone or single manufacturing system simulation(s) of FIG. 2, which is assumed to be good or correct. The method then advances to block 206 and establishes hardware PLC(s) and/or emulator based PLC(S) onto the simulation environment network, typically the office Ethernet 26. It should be appreciated that the system 10 can have multiple personal computers or PCs each running a control logic simulation of a specific line 16 or system 18 (tooling, MH, etc.) with each PC then being on the network. It should also be appreciated that if the PC is powerful enough or the simulation CPU and memory needs small enough, multiple simulation models could be run off a single PC with each simulation model still being put on the network.

After block 206, the method advances to block 208 and defines a network topic for each hardware/emulated PLC. PLC network topics are a unique prefix label descriptor, for example either text tag "Sta 12" or default numeric (1,2) to which I/O tags or addresses get appended to. It should be appreciated that the network topics cannot have duplicate identical topic names as topics distinguish the destination of I/O that may be using the same address label but are intended for different PLCs (e.g., Sta 12:100:01, Sta 13:100:01). It should also be appreciated that I/O mapping is already established for the single manufacturing system (e.g., cell, line) and is contained in simulation data files/tables. It should further be appreciated that the term "topic" is conventional and known in the art.

After block 208, the method advances to block 210 and links interlock I/O tags between the different control logic systems that were previously modeled individually in FIG. 2. The simulation based data table/file contains initial mapping of interlock I/O tags based on the initial manufacturing process design. It should be appreciated that interlock I/O bits and/or tags are designed into the PLC control logic to enable an "agreed to" part transfer condition between different control logic systems. It should also be appreciated that other devices may be on the plant network that are required to communicate to a PLC through the network.

After block 210, the method advances to block 212 and starts the hardware PLC(s) and/or emulator based PLC(s). The method then advances to block 214 and starts the simulation model(s) (equivalent to start up of tooling). The method advances to block 216 and runs or executes a multi-manufacturing system control logic simulation of the linked simulation models. After block 216, the method advances to block 218 and validates the PLC logic to see if the simulation works correctly. In block 216, the method validates the PLC logic for the multi-system control logic simulation by performing the test modes previously described.

From block 218, the method then advances to block 220 and tests interaction of the PLC logic. In block 220, the method tests the interlock logic portion of the PLC logic, for example, by interaction of the workcell line 16 or MH system 18 based on its interlock logic having dependencies set dynamically by a different system exercised based on the simulation. It should be appreciated that a "dummied up" interaction condition does not account for all the potential control system dependencies created by a dynamic system operating under its own set of control logic rules.

After block 220, the method advances to block 222 and debugs the interlock logic portion of the PLC logic. The debugging checks for transfer of parts from one system to a downstream system, manual mode test, automatic mode test, hardwired device test, failed network communications test, and test "timed out" logic interlock fault tests. The method advances to diamond 224 and determines whether to modify the PLC logic such as to add additional interlock I/O based on simulation results. For example, the user or operator through observation of the results of the simulation determines whether to modify the PLC logic based on results of the simulation. If so, this requires that the PLC logic be modified and that changes now made to the PLC logic to account for additional I/O may lead to unexpected system (inter cell, line) response, as I/O dependencies for the single manufacturing system logic may now be affected differently. As such, the method advances to block 210 previously described. If the PLC logic does not need to be modified, the method advances to diamond 226 to be described. It should be appreciated that the changes made to interlock I/O tags or dependencies and/or destinations will be continued to be updated via the simulation table/data map.

In diamond 226, the method determines whether there is a need to change interlock dependency bits (I/O tags). For example, the user or operator through observation of the results of the simulation determines whether there is a need to change interlock dependency bits (I/O tags). If so, this requires the interlock logic portion of the PLC logic to be modified as previously described. The interlock logic changes may introduce unplanned dependencies on other portions of the control logic system that were initially tested to be valid in the "single manufacturing" system environment. As such, the method advances to block 210 previously described. If not, the method advances to block 228 to be described.

In block 228, the method writes out or stores the APMD database/table/file in the database 30 of the APMD 28. This database may contain singular dependencies/destination information. This database may also contain a mapping of several I/O states related to an interlock (mapping a "situation" state).

After block 228, the method advances to block 230 and applies the APMD 28 to the Ethernet 26. The APMD 28 would monitor traffic across the Ethernet 26 and continuously compare the I/O tag status across the Ethernet 26 to the database 30 of validated I/O "tag" expected intents confirmed from control logic simulations stored in the database 30. The user interface 32 of the APMD 28 would display user chosen zones, which would typically be interlocked zone control I/O "tag" status. The method then advances to bubble 232 and ends. It should be appreciated that the AMPD 28 would identify the I/O tag and their respective value and/or destination (I/O tag dependencies) that had values not equal to the expected value.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of application protocol monitoring for a manufacturing line, said method comprising the steps of:
   constructing a manufacturing line model for the manufacturing line;
   utilizing logic for a programmable logic controller (PLC);
   executing a control logic simulation of the PLC logic;
   validating the PLC logic against the manufacturing line model;
   creating a database containing validated I/O tag expected intents confirmed from the control logic simulation; and
   applying the application protocol monitoring device to a network for the manufacturing line to monitor traffic across the network and continuously compare the I/O tag status across the network to the database of validated I/O tag expected intents.

2. A method as set forth in claim 1 including the step of bringing a PLC on line before said step of validating.

3. A method as set forth in claim 2 including the step of bringing the manufacturing line model on line.

4. A method as set forth in claim 1 including the step of saving a control logic simulation model after said step of correcting.

5. A method as set forth in claim 4 including the step of saving the PLC logic.

6. A method as set forth in claim 5 including the step of wiring up input/output (I/O) tag definitions for the PLC logic.

7. A method as set forth in claim 6 including the step of dummying up interlock I/O tags for the PLC logic.

8. A method as set forth in claim 1 wherein the step of validating the PLC code includes testing an automatic mode of the PLC logic.

9. A method as set forth in claim 1 wherein the step of validating the PLC code includes testing a manual mode of the PLC logic.

10. A method as set forth in claim 1 wherein the step of validating the PLC code includes testing at least one hard wired device of the PLC logic.

11. A method of application protocol monitoring for a manufacturing line, said method comprising the steps of:
    constructing a manufacturing line model for the manufacturing line;
    utilizing logic for a programmable logic controller (PLC);
    bringing a PLC on line;
    bringing the manufacturing line model on line;
    executing a control logic simulation of the PLC logic;
    validating the PLC logic against the manufacturing line model;
    correcting the PLC logic as required;
    creating a database containing validated I/O tag expected intents confirmed from the control logic simulation if the PLC logic is valid; and
    applying the application protocol monitoring device to a network for the manufacturing line to monitor traffic across the network and continuously compare the I/O tag status across the network to the database of validated I/O tag expected intents.

12. A method as set forth in claim 11 including the step of wiring up input/output (I/O) tag definitions for the PLC logic.

13. A method as set forth in claim 11 including the step of dummying up interlock I/O tags for the PLC logic.

14. A method as set forth in claim 11 wherein the step of validating the PLC code includes testing an automatic mode of the PLC logic.

15. A method as set forth in claim 11 wherein the step of validating the PLC code includes testing a manual mode of the PLC logic.

16. A method as set forth in claim 11 wherein the step of validating the PLC code includes testing at least one hard wired device of the PLC logic.

17. A method of application protocol monitoring for a manufacturing line, said method comprising the steps of:
    utilizing logic for a programmable logic controller (PLC) from a single manufacturing system simulation;
    establishing a plurality of PLCs on a simulation environment network;
    linking interlock input/output (I/O) tags;
    starting the PLCs;
    starting the simulation models;
    executing simulation of the PLCs and simulation models;
    validating the PLC logic;

determining whether the PLC logic is valid;
correcting the PLC logic if the PLC logic is not valid; and
creating a database containing validated I/O tag expected intents confirmed from the control logic simulation if the PLC logic is valid; and
applying the application protocol monitoring device to a network for the manufacturing line to monitor traffic across the network and continuously compare the I/O tag status across the network to the database of validated I/O tag expected intents.

18. A method as set forth in claim 17 including the step of debugging an interlock logic portion of the PLC logic.

19. A method as set forth in claim 18 including the step of determining whether to modify the PLC logic.

20. A method as set forth in claim 19 including the step of determining whether to change interlock dependency of the interlock logic portion if the PLC logic does not need to be modified.

* * * * *